Patented Aug. 8, 1939

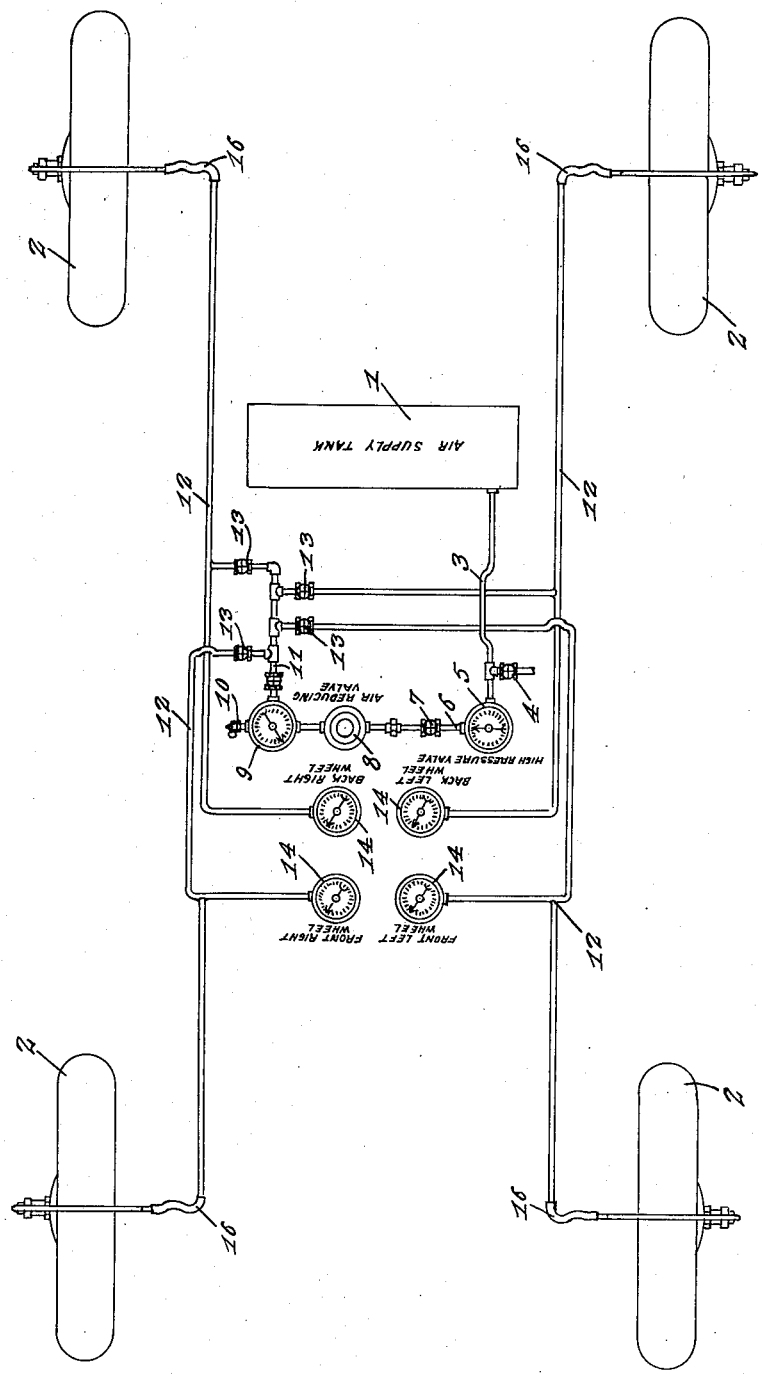

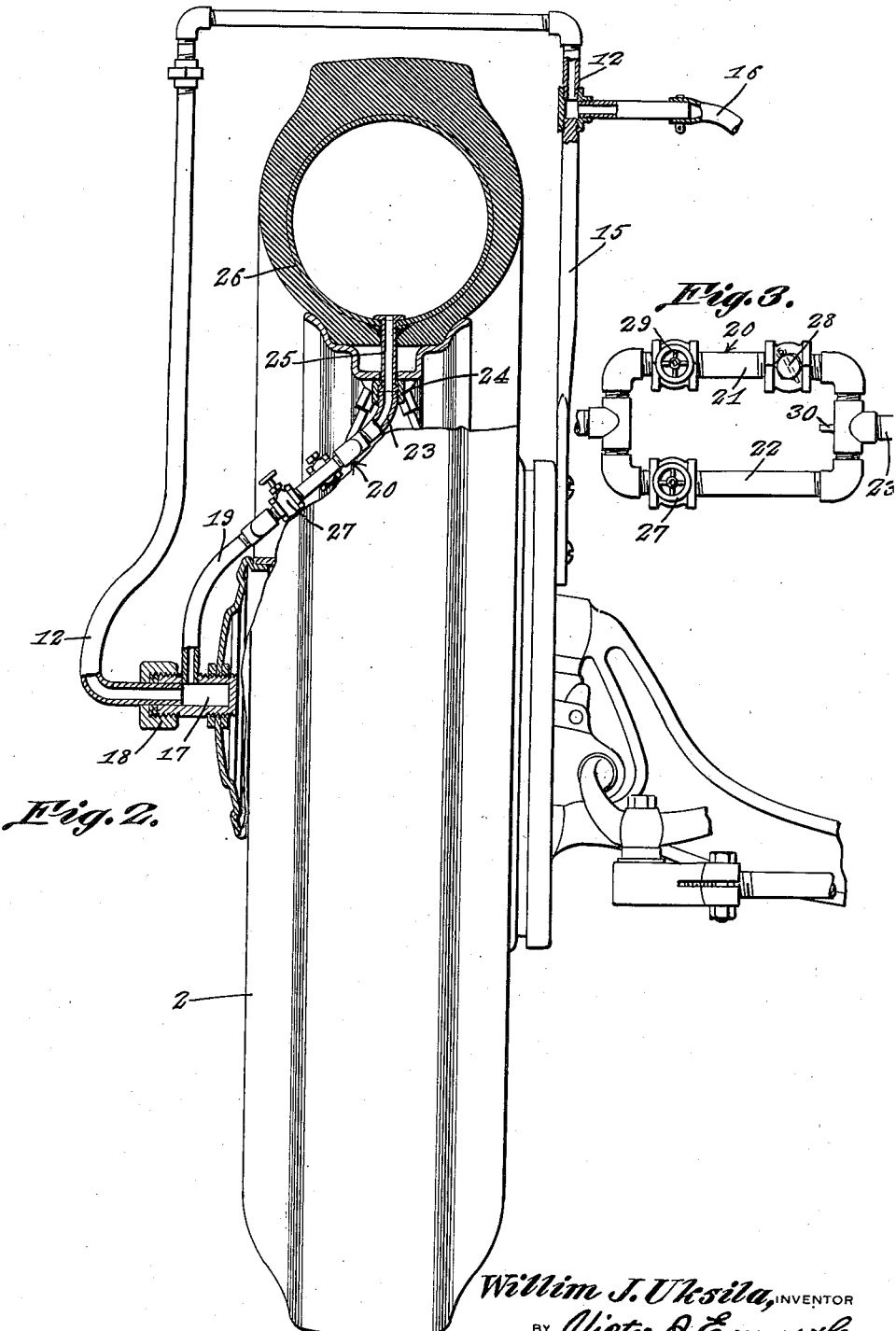

2,168,690

UNITED STATES PATENT OFFICE 2,168,690

AIR CONTROL DEVICE

William John Uksila, Spokane, Wash.

Application October 28, 1936, Serial No. 108,083

2 Claims. (Cl. 152—416)

This invention relates to tire inflating devices for motor vehicles and has for the primary object the provision of a device of this character, whereby all tires or any one of the tires of a motor vehicle may be inflated to a desired air pressure from an air supply carried by said vehicle and also permits any tire which may develop a leak to be fed with air sufficient to prevent deflation thereof so that the vehicle may proceed to a tire station for tire repair and also said device permits the operator of the vehicle to determine the exact air pressure of any one of the tires.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a diagrammatical view showing the device for inflating a tire of a motor vehicle and which device is constructed in accordance with my invention.

Figure 2 is a fragmentary sectional view showing the connection of the invention to the tire of a wheel.

Figure 3 is a fragmentary plan view showing a by pass construction.

Referring in detail to the drawings, the numeral 1 indicates an air supply tank adapted to be mounted upon a motor vehicle wherein the wheels thereof are indicated by the character 2. A main air supply pipe 3 connects with the tank 1 and is provided with a valve 4 of the character capable of having an air hose fitting adapted thereto whereby the tank 1 may be furnished with air under pressure from a service station or the valve 4 may be connected to a pneumatic pump forming a part of the vehicle equipment. Connected to the pipe 3 is a gage 5 to indicate the pressure of the air in the tank 1. Connected to the pipe 3 by way of the gage 5 is a pipe 6 and connected into said pipe 6 is a main control valve 7, an air reducing valve 8 and a master gage 9, the latter being provided with a drain valve 10. A pipe 11 is connected to the pipe 6 by way of the master gage 9 and has connected thereto pipes 12 each leading to a wheel of the motor vehicle and each provided with a control valve 13. The valves and gages heretofore mentioned are suitably mounted on the motor vehicle and preferably upon the instrument board so that the valves will be in convenient reach of the operator and the gages in view of the operator. Each pipe 12 has a pressure gage 14 connected thereto.

Suitable supports 15 are mounted on the vehicle adjacent the wheels and have the pipes 12 connected thereto. Said pipes 12 include in their construction flexible portions 16 which will permit parts of said pipes to move relative to other parts.

Each wheel has secured to the hub thereof a chambered member 17 provided with a stuffing gland 18 to receive a pipe 12. The stuffing gland 18 permits the chambered member 17 to rotate with the wheel relative to the pipe 12. Connected to the chambered member 17 is a pipe 19. The pipe 19 is connected to a by pass construction 20, one run thereof being indicated by the character 21 and the other run being indicated by the character 22. A pipe 23 is connected to the by pass construction 20 and is equipped with a fitting 24 for connecting the pipe 23 to the inflating valve 25 of the tire 26 of the wheel.

When adapting my invention to the tires of the wheels the usual valve elements of the inflating valves are removed so that the pipes 23 are connected to the valve stems or housings of the inner tubes placing the pipes in direct communication with the inner tubes of the tires.

Each by pass construction or the run 22 thereof has a cutoff valve 27 and the run 21 has a check valve 28 and a cutoff valve 29. Also each by pass construction may be provided with an inflating valve 30 similar in construction to the inflating valve of an inner tube of a tire and which is in direct communication with the pipe 23.

Under normal operation with this device the valves 27 are closed. To admit air to the tires of the vehicle from the tank 1, the valves 7 and 13 are opened. Should at any time it be desirable to inflate a tire directly, the valve 30 connected with said last-named tire may have applied thereto the usual air pressure supply hose of a service station. In some instances it may be only necessary to inflate one tire of the vehicle and the pipe leading to that tire has the valve 13 thereof opened while the other valves 13 are left closed. The valve 7 is then opened to admit air to the tire needing inflation.

The gage 9 indicates the air pressure passing to the tires and when it is desired to determine the air pressure in the tires the valves 29 are closed and the valves 27 are opened placing the gages 14 in communication with said tire whereby the reading of said gages denote the air pressure within the tires.

If one of the tires becomes punctured or loses air from some cause the valve 13 of the pipe 12 leading to said tire is open and also the valve 7 permitting air under pressure to pass to the damaged tire in an amount sufficient to prevent deflation of the tire so that the vehicle may proceed to a service station for tire repair.

Having described the invention, I claim:

1. A device of the character described comprising an air line leading from a source of air under pressure to a pneumatic tire on a vehicle wheel, said line including a check valve and control valve, an air pressure gauge between said check valve and said source, and a by-pass around said check valve and control valve, said by-pass being provided with a control valve.

2. A device of the character described comprising an air line leading from a source of air under pressure to a pneumatic tire, said line including a check valve and a control valve, an air pressure gauge between said check valve and said source, and a by-pass around said check valve and provided with a control valve.

WILLIAM JOHN UKSILA.